Patented Dec. 12, 1933

1,938,864

UNITED STATES PATENT OFFICE 1,938,864

INSECTICIDAL EMULSION

Bruno Rewald, Hamburg, Germany, assignor to firm Hanseatische Muhlenwerke Aktiengesellschaft, Hamburg, Germany No Drawing. Application October 21, 1929
Serial No. 401,381

1 Claim. (Cl. 167—16)

The present invention relates to insecticides, and in particular insecticides which are emulsions containing oils such as mineral oil, in which lecithin is used as emulsifying agent, either alone or jointly with other emulsifying agents, the lecithin cooperating with a basic substance, which may be an alkali such as caustic soda, soap, sodium carbonate, or an organic base such as pyridin, nicotin, trimethyl amin, anilin, toluidin, cholin, or similar materials (and the term "basic substance" is so used hereinafter). The emulsion may also contain various other insecticides such as copper compounds, (organic or inorganic) lead compounds, arsenicals or any other suitable organic or inorganic compounds. The mineral oil may be one which is more or less volatile such as kerosene or naphtha, or it may be heavier mineral oils such as gas oil, or crude petroleum may be employed.

In the present invention lecithin, with a basic substance constitutes an excellent emulsifying agent, whereby the mineral oil becomes very completely emulsified, in a rather permanent fashion, with the aqueous material. In some cases it is possible to mix up the lecithin, basic material, mineral oil, and other insecticidal materials, to produce a liquid "miscible oil" which will readily mix with water to form an emulsion, the mixing with water being done by the user of the insecticide. In place of using the lecithin in its free state, it may previously be reacted with copper hydroxid to produce copper salt of lecithin, which has not, so far as I am advised, heretofore been used in insecticidal compositions.

I give the following examples—

Example 1

25 to 75 parts of mineral oil are mixed with 20 parts of lecithin, 5 parts of fatty acids (for example the fatty acids from soybean oil, fish oil, cottonseed oil or other cheap liquid oils) and with 0.25 to 1 part of an organic base such as pyridin, trimethyl amin, cholin or nicotin. This liquid is stable and will keep for a long time, and can subsequently be mixed with 50 to 300 times its own volume of water to produce an emulsion for spraying upon growing plants. To the above oily liquid may be added any other common insecticidal material such as paris green (which should preferably be reduced to a very fine powder), calcium arsenate, or other insecticide whether it is soluble in the oil or not. Of course if insoluble materials are used, the liquid will have to be thoroughly mixed before adding to the water. At the time of mixing the oily material above referred to with the water, various other insecticides can be added to the water if desired.

Example 2

35 parts of lecithin are mixed with 65 parts of mineral oil, containing .25 to 1 part of an organic base as above described. One part of this mixture can be used with 50 to 300 parts (preferably about 200 parts) of water to form an emulsion, and other insecticides as described above can be added if desired.

I call attention to the reference above made to the use of copper salt of lecithin, this material is particularly advantageous to use in an insecticide since it not only has the emulsifying properties of the lecithin but also has the insecticidal properties of the copper.

The term "insecticide" and the term "insecticidal" as used herein, are used in their broad sense as meaning not only substances which will kill insects, but substances which will be obnoxious to insects, scale, fungi (including blight, spore and the like).

I call attention to the use of nicotin in the composition, which not only possesses insecticidal properties, but also acts as a base, for example in the neutralization of the free fatty acids.

The term "aqueous material" as used herein, may be water alone or water containing water-soluble materials of the kinds stated above and/or the reaction products of the materials employed herein.

I claim:—

An insecticidal composition containing the copper salt of lecithin.

BRUNO REWALD.